(12) United States Patent
Cash et al.

(10) Patent No.: US 11,170,379 B2
(45) Date of Patent: Nov. 9, 2021

(54) PEER FORWARD AUTHORIZATION OF DIGITAL REQUESTS

(71) Applicant: Visa International Service Association, San Francisco, CA (US)

(72) Inventors: Duane Cash, Mt. View, CA (US); Kelvan Howard, San Francisco, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 254 days.

(21) Appl. No.: 15/041,495

(22) Filed: Feb. 11, 2016

(65) Prior Publication Data
US 2016/0239842 A1    Aug. 18, 2016

Related U.S. Application Data

(60) Provisional application No. 62/116,276, filed on Feb. 13, 2015.

(51) Int. Cl.
*G06Q 20/42* (2012.01)
*G06Q 20/22* (2012.01)

(52) U.S. Cl.
CPC ......... *G06Q 20/42* (2013.01); *G06Q 20/2295* (2020.05)

(58) Field of Classification Search
CPC ............ G06Q 20/3821; G06Q 20/405; G06Q 20/367; G06Q 20/409; G06Q 20/42; G06Q 20/2295; G06F 3/0607; G06F 3/0631; G06F 21/105; G06F 21/31; G06F 21/602
See application file for complete search history.

(56) References Cited

U.S. PATENT DOCUMENTS

| 5,953,710 A  | 9/1999  | Fleming |
| 6,163,771 A  | 12/2000 | Walker  |
| 8,615,437 B2 | 12/2013 | Yoo     |
| 8,630,904 B2 | 1/2014  | Yoo     |

(Continued)

FOREIGN PATENT DOCUMENTS

| CN | 1902657   | 1/2007  |
| CN | 101884051 | 11/2010 |

(Continued)

OTHER PUBLICATIONS

International Search Report and Written Opinion dated Jul. 15, 2016 in PCT Application No. PCT/US2016/017487, 10 pages.

(Continued)

*Primary Examiner* — Johann Y Choo
(74) *Attorney, Agent, or Firm* — Kilpatrick Townsend & Stockton LLP

(57) ABSTRACT

Embodiments may enable a user to forward authorize a specific amount to a member of their payment pool by distributing a subtoken generated from a token issued to the user. The member of the payment pool may receive the subtoken through a delivery channel (e.g., by e-mail) and may utilize the subtoken during a purchase by providing a corresponding delivery channel identifier (e.g., e-mail address) as an authentication credential. In some embodiments, the subtoken may be time-sensitive and may be valid during a time period designated by the user.

20 Claims, 7 Drawing Sheets

(56) References Cited

U.S. PATENT DOCUMENTS

| | | | |
|---|---|---|---|
| 8,762,216 B1* | 6/2014 | Bhosle | G06Q 30/06 705/26.1 |
| 9,021,569 B1 | 4/2015 | Kashyap et al. | |
| 2002/0138392 A1* | 9/2002 | LeBlanc | G06Q 40/04 705/37 |
| 2002/0178086 A1* | 11/2002 | Margeson | G06Q 10/02 705/26.1 |
| 2003/0154164 A1* | 8/2003 | Mascavage, III | G06Q 20/04 705/39 |
| 2004/0177005 A1* | 9/2004 | Poltorak | G07F 7/02 705/21 |
| 2007/0017976 A1 | 1/2007 | Peyret et al. | |
| 2007/0288480 A1* | 12/2007 | Caplan | G06F 16/9537 |
| 2008/0133716 A1* | 6/2008 | Rao | H04L 67/02 709/220 |
| 2008/0177661 A1* | 7/2008 | Mehra | G06Q 20/305 705/44 |
| 2009/0006254 A1* | 1/2009 | Mumm | G06Q 20/385 705/44 |
| 2010/0133335 A1* | 6/2010 | Maguid | G06Q 20/3227 235/380 |
| 2010/0161965 A1* | 6/2010 | Solin | H04L 9/3268 713/155 |
| 2013/0046690 A1* | 2/2013 | Calman | G06Q 40/02 705/44 |
| 2013/0124412 A1 | 5/2013 | Itwaru | |
| 2014/0129428 A1 | 5/2014 | Tyler et al. | |
| 2014/0164243 A1* | 6/2014 | Aabye | G06Q 20/3821 705/44 |
| 2014/0189782 A1* | 7/2014 | Mendelovich | H04L 63/08 726/1 |
| 2014/0379575 A1 | 12/2014 | Rogan | |
| 2015/0149336 A1* | 5/2015 | Haggerty | G06Q 40/02 705/35 |
| 2015/0254647 A1 | 9/2015 | Bondesen et al. | |
| 2019/0050557 A1* | 2/2019 | Martin | H04L 63/20 |

FOREIGN PATENT DOCUMENTS

| | | |
|---|---|---|
| CN | 103618717 | 3/2014 |
| RU | 2713703 | 2/2020 |
| WO | 2012167165 A3 | 12/2012 |

OTHER PUBLICATIONS

Examination Report dated Mar. 5, 2018 in Singaporean Application No. 11201704524U, 4 pages.

RU2017131844 , "Office Action", dated Aug. 21, 2019, 14 pages.

RU2017131844 , "Notice of Decision to Grant", dated Nov. 29, 2019, 15 pages.

Application No. CN201680009985.1 , Office Action, dated Aug. 27, 2020, 20 pages.

"China Credit Card", Anonymous Industry News, vol. 11, Nov. 30, 2013, 3 pages.

Application No. CN201680009985.1 , Office Action, dated Feb. 20, 2021, 22 pages.

Application No. CN201680009985.1 , Office Action, dated Jun. 21, 2021, 20 pages.

* cited by examiner

PEER FORWARD AUTHORIZATION OF DIGITAL REQUESTS

CROSS-REFERENCES TO RELATED APPLICATIONS

This application claims priority to U.S. Provisional Patent Application No. 62/116,276, filed Feb. 13, 2015, and is herein incorporated by reference in its entirety.

BACKGROUND

There are instances where an originating party may want to provide credentials to a subordinate party so that the subordinate party can perform a transaction. For example, a parent user may want to permit their child to conduct a payment on their own without the parent being present. In another example, a parent may want to give their child access rights to a certain location. When credentials are passed from the parent to the child to conduct the transaction, there is a risk that an unauthorized person may obtain those credentials. That unauthorized person may then conduct the transaction. Secure methods and systems for allowing credentials that are used to subordinate users in a safe and secure manner are needed.

Embodiments of the invention address this and other problems, individually and collectively.

SUMMARY

According to one embodiment of the invention, first credentials corresponding to a first data element for a first user are generated. Second credentials corresponding to a second data element are generated for a second user. The first user may be a parent and the second user may be a child. The second credentials are associated with the first credentials. The second credentials are sent to the second user through a delivery channel, such as a test message delivery channel. Subsequently, the second credentials and a delivery channel identifier associated with the second user is received with a request by the second user. The request is fulfilled according to the second data element.

Some embodiments of the present invention relate to systems and methods for generating and utilizing subtokens from tokens issued to a user that can allow recipients to utilize set amounts from the user's account, while still providing security for the user's sensitive data. These systems and methods can allow users to authorize specific individuals in a payment pool. Accordingly, recipients can utilize subtokens by providing appropriate authentication credentials at the time of purchase.

According to one embodiment of the invention, a first token corresponding to a first amount is generated for a user. A second token corresponding to a second amount is then generated, wherein the second token can be associated with the first token. The second token can be sent to a recipient through a delivery channel. Subsequently, the second token and a delivery channel identifier associated with the recipient can be received during a transaction conducted by the recipient. The transaction can be completed after the second amount is deducted from the account of the user.

According to one embodiment of the invention, a first account identifier corresponding to a first amount is generated for a user. A second account identifier corresponding to a second amount is then generated, wherein the second account identifier can be associated with the first account identifier. The second account identifier can be sent to a recipient through a delivery channel. Subsequently, the second account identifier and a delivery channel identifier associated with the recipient can be received during a transaction conducted by the recipient. The transaction can be completed after the second amount is deducted from the account of the user. According to one embodiment of the invention, the second account identifier can be a prepaid card number.

Embodiments of the invention are further directed to a server computer comprising a processor and a memory element. The memory element can comprise code, executable by the processor, for implementing the above described method.

These and other embodiments of the invention are described in further detail below.

DETAILED DESCRIPTION

Figure 1:
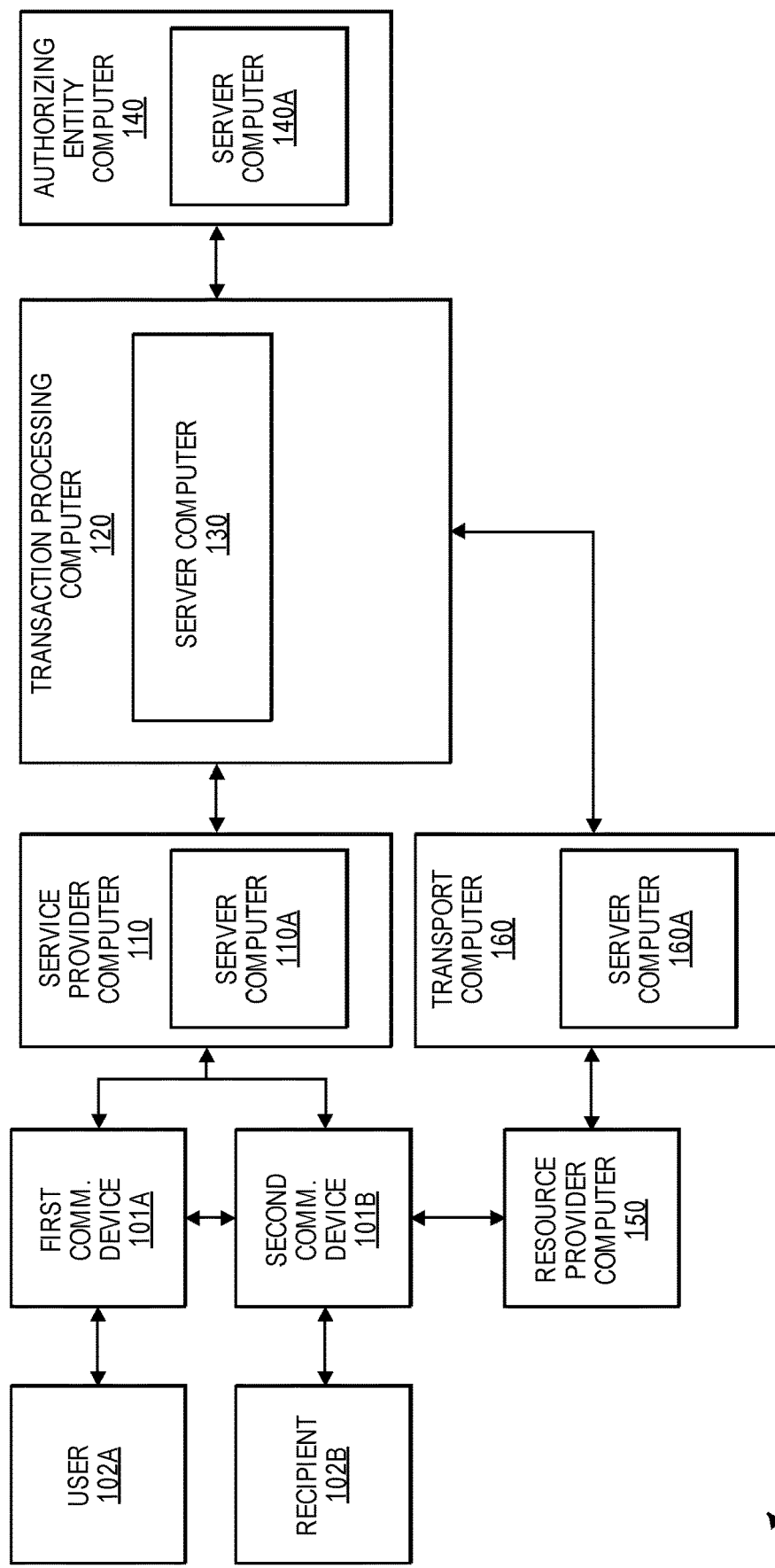
FIG. 1 shows a block diagram of a system according to embodiments of the present invention.

Embodiments of the invention are directed to methods which can include generating a second credential for a subordinate user from a first credential from a primary user such as a parent. The second credential may be associated with the first credential. For example, the first credential may include a primary account number that is used by a parent to conduct purchases, while the second credential may be a secondary account number that is used by a child to conduct purchases. The secondary account number may be associated with the primary account number in that the secondary account number may be derived from and/or linked to the primary account number. Once created, the second credential may be delivered through one of many potential delivery channels (e.g., voice, e-mail, text message, instant message, etc.). To use the second credential, the recipient needs to provide information regarding the delivery channel in addition to the second credential in order to use the second credential to conduct a transaction.

Specific embodiments of the present invention relate to systems and methods for generating and utilizing peer-forwarded subtokens that allow authorized recipients in a payment pool to make transactions of specific amounts with the account of a user. A subtoken may be a type of token generated from tokens issued to the user and may be associated with the account of the user. No sensitive information about a user is revealed to a recipient and merchant associated with a transaction conducted with a subtoken. After a subtoken is generated from an enrolled token of the user, it may be sent to the recipient by a delivery channel (e.g., by e-mail). The recipient can utilize the subtoken by providing appropriate authentication credentials (e.g., e-mail address) at the time of purchase.

Before discussing specific embodiments and examples, some descriptions of terms used herein are provided below.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. Further, an "access device" may be an example of or part of a "resource provider computer," if the access device is operated by a resource provider.

An "account identifier" may be an identifier for an account. An account identifier may include a token (including an original token or a subtoken) or a real account identifier (e.g., a real PAN).

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorization request message" may be an electronic message that is sent to a payment processing network and/or an issuer of a payment card to request authorization for a transaction. An authorization request message according to some embodiments may comply with (International Organization of Standardization) ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

An "authorizing entity" may be an entity that authorizes a request. Examples of an authorizing entity may be an issuer, a governmental agency, a document repository, an access administrator, etc.

A "communication device" may comprise any suitable electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of communication devices include mobile phones (e.g., cellular phones), PDAs, tablet computers, net books, laptop computers, personal music players, handheld specialized readers, watches, fitness bands, ankle bracelets, rings, earrings, etc., as well as automobiles with remote communication capabilities. A communication device may comprise any suitable hardware and software for performing such functions, and may also include multiple devices or components (e.g., when a device has remote access to a network by tethering to another device—i.e., using the other device as a modem—both devices taken together may be considered a single communication device).

"Credentials" may comprise any evidence of authority, rights, or entitlement to privileges. For example, access credentials may comprise permissions to access certain tangible or intangible assets, such as a building or a file. In another example, payment credentials may include any suitable information associated with and/or identifying an account (e.g., a payment account and/or payment device associated with the account). Such information may be directly related to the account or may be derived from information related to the account. Examples of account information may include an "account identifier" such as a PAN (primary account number or "account number"), a token, a subtoken, a gift card number or code, a prepaid card number or code, a user name, an expiration date, a CVV (card verification value), a dCVV (dynamic card verification value), a CVV2 (card verification value 2), a CVC3 card verification value, etc. An example of a PAN is a 16-digit number, such as "4147 0900 0000 1234". In some embodiments, credentials may be considered sensitive information.

A "data element" can include any unit of data or information. For example, in a transaction context, a data element may include an amount of money, a type of transaction, a particular merchant, a type of merchant, etc. In an access context, a data element may include access levels or permissions.

A "delivery channel" can include any identifiable means for transporting tangible or intangible assets. Examples of delivery channels include e-mail, file transfer protocol (FTP), hypertext transfer protocol (HTTP), telephone, mail, courier, text message (e.g., SMS), and the like. Examples of delivery channel identifiers include e-mail addresses, website addresses, IP addresses, communication device identifiers, phone numbers, physical addresses, and the like.

A "digital wallet" can include an electronic application or device that allows an individual to conduct electronic commerce transactions. A digital wallet may store user profile information, payment credentials, bank account information, one or more digital wallet identifiers, and/or the like, and can be used in a variety of transactions, such as but not limited to eCommerce, social networks, money transfer/ personal payments, mobile commerce, proximity payments, gaming, and/or the like for retail purchases, digital goods purchases, utility payments, purchasing games or gaming credits from gaming websites or systems, transferring funds between users, and/or the like. A digital wallet may be designed to streamline the purchase and payment process. A digital wallet may allow the user to load one or more payment cards onto the digital wallet so as to make a payment without having to enter an account number or present a physical card. A digital wallet may also store transaction records (e.g., electronic receipts).

An "issuer" may typically refer to a business entity (e.g., a bank) that maintains an account for a user. An issuer may also issue payment credentials stored on communications devices.

A "resource provider" may be an entity that can provide a resource such as goods, services, information, and/or access. Examples of a resource provider include merchants, access devices, secure data access points, etc. A "merchant" may typically be an entity that engages in transactions and can sell goods or services, or provide access to goods or services.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "service provider" may be an entity that can provide a service or application. An example of a service provider is a digital wallet provider.

A "token" may include a substitute identifier for some information. For example, a payment token may include an identifier for a payment account that is a substitute for an account identifier, such as a primary account number (PAN). For instance, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction. The token may also be used to represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "subtoken" may include a substitute identifier for a token or another subtoken. It may have the same or different form as the token or subtoken from which it originates. A subtoken, for example, may be 16 digits long like the token with which it is associated, and also like the real account number associated with the token. In some embodiments, the subtoken may not have its own underlying account, but the value of the subtoken may be derived from the real account that is based upon an intervening token.

I. Systems

FIG. 1 shows a block diagram of system 100 according to embodiments of the present invention. The system 100 includes a first communication device 101A, a second communication device 101B, a service provider computer 110, a transaction processing computer 120, an authorizing entity computer 140, a resource provider computer 150, and transport computer 160. Each of these systems and computers may be in operative communication with each other. In some embodiments, the first communication device 101A may be operated by a user 102A, and the second communication device 101B may be operated by a recipient 102B.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the Internet), using any suitable communications protocol.

User 102A may operate first communication device 101A and may authorize recipient 102B operating second communication device 101B to utilize a subtoken associated with account of user 102A. Typically, user 102A may authorize recipient 102B as a member of their payment pool (e.g., family members, friends, etc.). Recipient 102B may utilize a delivery channel identifier (e.g., their e-mail address, communication device identifier, phone number, etc.) as an authorization code or signature when conducting a purchase with a subtoken associated with user 102A in one embodiment.

Each of communication devices 101A and 101B may be any device suitable to carry out a financial transaction or any other additional related actions. Each of communication device 101A and 101B may include a memory that may store a mobile wallet application or payment application. The application may be provisioned with account information to enable each mobile device to conduct transactions. Each of communication device 101A and 101B may also include a secure element that can be implemented in either hardware and/or software, which may store sensitive account or personal information. Communication device 101A and 101B may communicate over a communication network with one or more entities, including transaction processing computer 120.

The service provider computer 110 may comprise a server computer 110A to facilitate the provisioning process. The server computer 110A may include a processor and a computer readable medium coupled to the processor, the computer readable medium comprising code, executable by the processor.

The service provider computer 110 may be operated or associated with an application provider. The application provider may be an entity that provides an application to a mobile device for use by a user. In some embodiments, the application provider can be a digital wallet provider that provides a digital wallet or payment application to a mobile device. The service provider computer 110 may maintain one or more digital wallets for each user, and each digital wallet may be associated with payment data for one or more payment accounts. Examples of digital wallets may include Visa Checkout™ or Google™ Wallet, etc. The server computer 110A may send and receive over-the-air (OTA) messages to a digital wallet application stored on the communication device 101A or 101B. The service provider server computer 110A may include a processor and a computer readable medium coupled to the processor, the computer readable medium comprising code, executable by the processor for performing the functionality described in further detail below.

The resource provider computer 150 may be configured to receive transaction data from an access device. Resource provider computer 150 may enable a resource provider such as a merchant to engage in transactions, sell goods or services, or provide access to goods or services to the consumer. The resource provider computer 150 may accept multiple forms of payment and may use multiple tools to conduct different types of transactions. For example, the resource provider computer 150 may communicate with, include, or be an access device at a physical store operated by the merchant for in-person transactions. The resource provider computer 150 may also enable the merchant to sell goods and/or services via a website, and may accept payments over the Internet.

The transaction processing computer 120 may comprise a server computer 130. The server computer 130 may include a processor and a computer readable medium coupled to the processor, the computer readable medium comprising code, executable by the processor.

The transaction processing computer 120 may be associated with one or more payment service providers. The transaction processing computer 120 may include any entity that provides provisioning or personalization services. For example, the transaction processing computer 120 may maintain a personalization database with user information, and the transaction processing computer 120 may be configured to communicate with one or more authorizing entity computers 140 to determine personalized payment data for users. The transaction processing computer 120, via a provisioning service module, may provide provisioning services to the service provider computer 110, in which the service provider computer 110 may utilize an application programming interface (API) to communicate with the transaction processing computer server computer 130.

In some embodiments, the transaction processing computer 120 may include modules that provide additional services, including but not limited to a token generator module that can generate and/or provide a "payment token" that is associated with sensitive data (e.g., account information). For example, the token generator module may generate a payment token that can be used as a substitute for a real account identifier (e.g., a Primary Account Number (PAN) of an account), and maintain a stored association (e.g., mapping) between the payment token and the PAN, such that a token exchange module is able to "translate" the payment token back to the original PAN. In some embodiments, the payment token is mathematically derived from the original PAN. In other embodiments, the payment token is randomly generated with respect to the original PAN, and is simply linked to it in a data table. Regardless of how the payment token is generated from the PAN and vice versa, the use of a payment token instead of a real account identifier during a transaction can provide enhanced security. In some embodiments, the payment token and/or information regarding the payment token may be stored in a token vault.

In some embodiments, the token generator module may generate subtokens based on existing tokens. A subtoken may be associated with the same user as its parent token. The original user may request generation of the subtoken by designating an amount and recipient e-mail address for the subtoken. The information may be sent to the transaction processing computer 120, which may generate the subtoken at its token generator module. In some implementations, the user may also set a time period for making a purchase using the subtoken, so that the subtoken will expire according to the initial time-stamp set on the subtoken. In some embodiments, the subtoken is mathematically derived from the original token. In other embodiments, the subtoken is randomly generated with respect to the original token, and is simply linked to it in a data table.

The transport computer 160 may comprise a server computer 160A. The server computer 160A may include a processor and a computer readable medium coupled to the processor, the computer readable medium comprising code, executable by the processor. The transport computer 160 is typically a system for an entity (e.g., a bank) that has a business relationship with a particular merchant or other entity. The transport computer 160 may route the authorization request for a transaction to the authorizing entity computer 140 via transaction processing computer 120.

The authorizing entity computer 140 may comprise a server computer 140A. The server computer 140A may include a processor and a computer readable medium coupled to the processor, the computer readable medium comprising code, executable by the processor. In some embodiments, the authorizing entity computer 140 may communicate with the transaction processing computer 120 to conduct transactions.

The authorizing entity computer 140 is typically run by a business entity (e.g., a bank) that may have issued the payment (credit/debit) card, account numbers or payment tokens used for the transactions. Some systems can perform both authorizing entity computer 140 and transport computer 160 functions. When a transaction involves a payment account associated with the authorizing entity computer 140, the authorizing entity computer 140 may verify the account and respond with an authorization response message to the transport computer 160 that may be forwarded to the corresponding access device and the consumer device if applicable.

At a later time (e.g., at the end of the day), a clearing and settlement process can occur between the transport computer 160, the transaction processing computer 120, and the authorizing entity computer 140.

Figure 2:
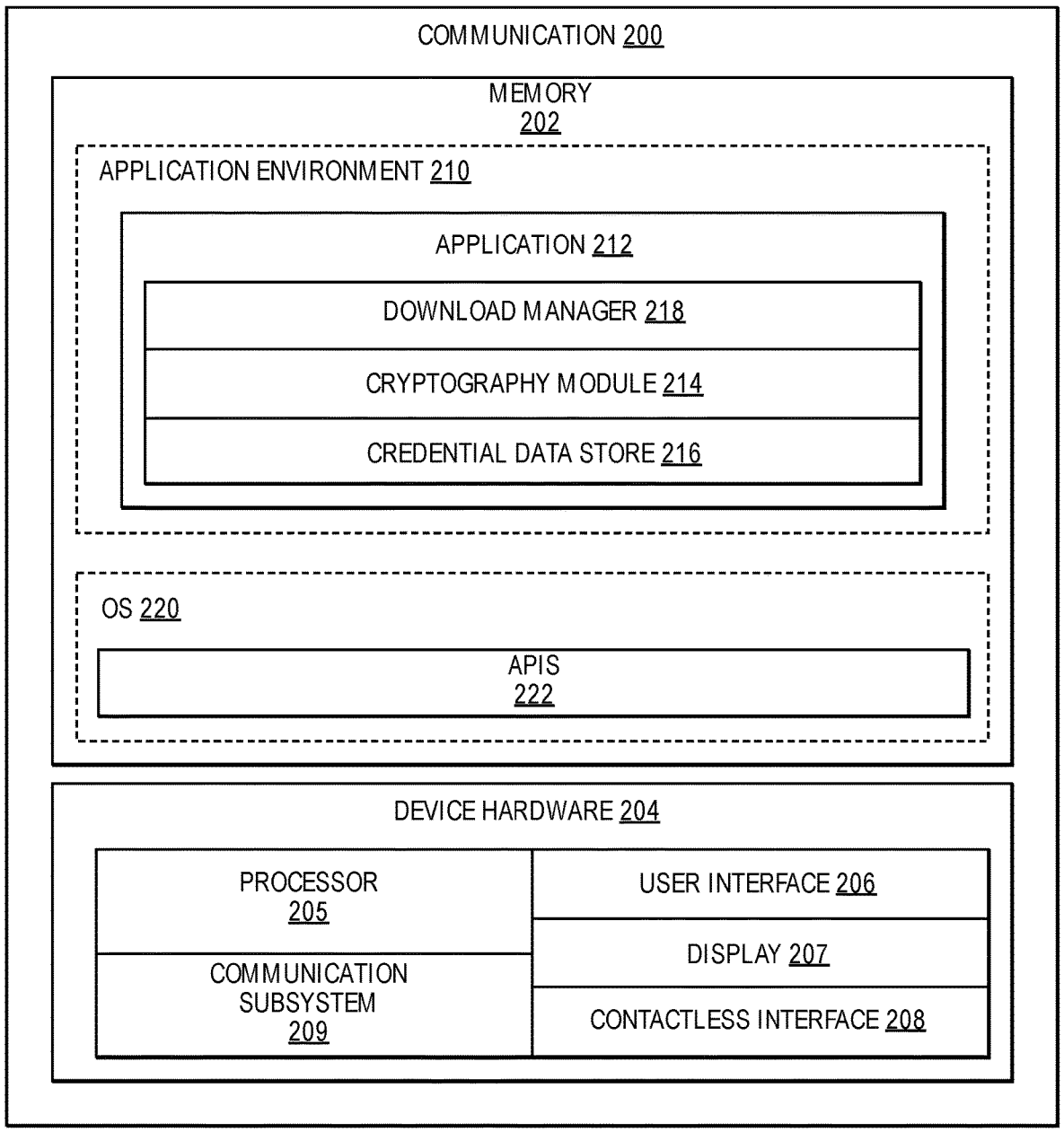
FIG. 2 shows a block diagram of a communication device according to embodiments of the present invention.

FIG. 2 shows a block diagram of a communication device 200 according to embodiments of the present invention. Communication device 200 may be used to implement first communication device 101A and/or second communication device 101B of FIG. 1, for example. Communication device 200 may include device hardware 204 coupled to a memory 202. Device hardware 204 may include a processor 205, a communications subsystem 209, and a user interface 206. In some embodiments, device hardware 204 may include a display 207 (which can be part of user interface 206). Device hardware 204 may also include a contactless interface 208, for example, in some embodiments in which communication device 200 is a portable communication device. Processor 205 can be implemented as one or more integrated circuits (e.g., one or more single core or multicore microprocessors and/or microcontrollers), and is used to control the operation of communication device 200. Processor 205 can execute a variety of programs in response to program code or computer-readable code stored in memory 202, and can maintain multiple concurrently executing programs or processes. Communications subsystem 209 may include one or more RF transceivers and/or connectors that can be used by portable communication device 200 to communicate with other devices and/or to connect with external networks. User interface 206 can include any combination of input and output elements to allow a user to interact with and invoke the functionalities of communication device 200. In some embodiments, user interface 206 may include a component such as display 207 that can be used for both input and output functions.

Contactless interface 208 may include one or more specialized RF transceivers (e.g., near field communication (NFC) transceivers) to interact with a contactless reader of an access device to conduct a transaction (e.g., payment transaction, access transaction, information exchange, etc.). In secure element based implementations, only a secure element (not shown) may have access to contactless interface 208. In some embodiments, contactless interface 208 can be accessed by the mobile OS 220 using specialized card emulation APIs 222 without requiring the use of a secure element. In some embodiments, display 207 can also be part of contactless interface 208, and is used, for example, to perform transactions using QR codes, bar codes, etc.

Memory 202 can be implemented using any combination of any number of non-volatile memories (e.g., flash memory) and volatile memories (e.g., DRAM, SRAM), or any other non-transitory storage medium, or a combination thereof media. Memory 202 may store an operating system (OS) 220 and an application environment 210 where one or more applications reside including application 212 to be executed by processor 205. In some embodiments, OS 220 may implement a set of card emulation APIs 222 that can be invoked by application 212 to access contactless interface 208 to interact with an access device.

Application 212 can include an application that uses, accesses, and/or stores sensitive information, tokens or subtokens. For example, application 212 can include a digital wallet or payment application that uses credentials (e.g., a token, subtoken, and/or payment credentials) to conduct transactions via communication device 200. In some embodiments, access to application 212 by a user can be protected by user authentication data such as a password, passcode, PIN, etc. For example, when a user attempts to launch or execute application 212, the user may be requested to enter valid user authentication data before the user can access application 212. Application 212 may include a download manager 218, a cryptography module 214, and a credential (e.g., token, subtoken, and/or payment credentials) data store 216. In some embodiments, one or more of these components can be provided by another application or component that is not part of application 212.

Download manager 218 can be programmed to provide functionalities to communicate with an application provider associated with application 212 to download information via the application provider. Download manager 218 working in conjunction with the processor 205 may request or otherwise manage the acquisition and/or storage of credentials. For example, download manager 218 working in conjunction with the processor 205 may request and obtain credentials via the application provider associated with application 212, and store the credentials in credential data store 216. In some embodiments, the credentials provided by the application provider can be received in an encrypted form. For example, the credentials can be encrypted with a session key generated by a server computer. Download manager 218 working in conjunction with the processor 205 may also receive, from the application provider, the session key in an encrypted form, and store the encrypted session key in credential data store 216.

Cryptography module 214 working on conjunction with the processor 205 may provide cryptographic functionalities for application 212. For example, cryptography module 214 may implement and perform encryption/decryption operations for application 212 using encryption algorithms such as DES, AES, TDES, or the like, and/or hash functions such as SHA, or the like. For example, when application 212 accesses credential data store 216 to retrieve and use the credentials stored therein (e.g., to conduct a transaction), application 212 may invoke cryptography module 214 to decrypt the session key that is used to encrypt the stored credentials, and then decrypt the credentials using the decrypted session key. The decrypted credentials can then be used by application 212.

Figure 3:
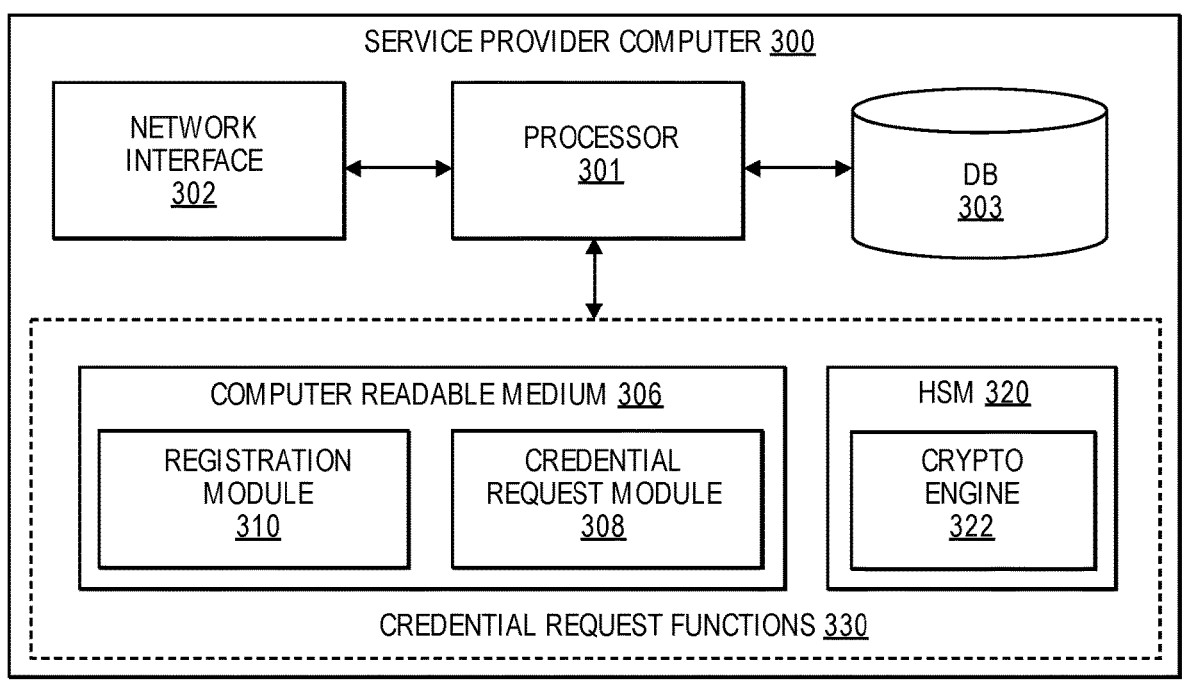
FIG. 3 shows a block diagram of a service provider computer according to embodiments of the present invention.

FIG. 3 shows a block diagram of a service provider computer 300 according to embodiments of the present invention. Service provider computer may be implemented as service provider computer 110 of FIG. 1, for example. Service provider computer 300 may be associated with an application provider, according to some embodiments. For example, service provider computer 300 can provide a software application or services associated with the application for a communication device. Service provider computer 300 may include a processor 301 coupled to a network interface 302 and a computer readable medium 306. In some embodiments, service provider computer 300 may also include a hardware security module (HSM) 320. Service provider computer 300 may also include or otherwise has access to a user database 303 that may be internal or external to service provider computer 300.

Processor 301 may include one or more microprocessors to execute program components for performing the credential request functions 330 of service provider computer 300. Network interface 302 can be configured to connect to one or more communication networks to allow service provider computer 300 to communicate with other entities such as a communication device operated by a user, a server computer, etc. Computer readable medium 306 may include any combination of one or more volatile and/or non-volatile memories, for example, RAM, DRAM, SRAM, ROM, flash, or any other suitable memory components. Computer readable medium 306 may store code executable by the processor 301 for implementing some or all of the credential request functions 330 of service provider computer 300. For example, computer readable medium 306 may include code implementing a registration module 310 and a credential request module 308. In some embodiments, service provider computer 300 may also include a hardware security module (HSM) 320 to implement a cryptography engine 322.

Registration module 310 may work in conjunction with the processor 301 to register users with service provider computer 300. For example, a user can be registered with the application provider by providing registration module 310 with user identifying information to identify the user, device information such as a device identifier associated with the user's communication device on which an application associated with the application provider is installed, account information such as an account identifier associated with the user's account, etc. In some embodiments, a user may set up user authentication data (e.g., password, passcode, PIN, etc.) using the registration module 310 and the processor 301. The user authentication data can be used by service provider computer 300 to authenticate the user when the application on the user's communication device communicates with service provider computer 300. Registration module 310 may work in conjunction with the processor 301 to also allow a user to change or update the user authentication data. The registration information can be stored in a user database 303. In some embodiments, the registration process can be carried out when the user first downloads the application for installation on the user's communication device, or when the user first launches and executes the application.

Credential request module 308 is programmed to process requests for credentials (e.g., payment credentials, tokens, subtokens, etc.) received from the application installed on a user's communication device. In some embodiments, upon receiving a request from the application on the user's communication device, credential request module 308 in conjunction with the processor 301 may authenticate the user and/or the communication device by verifying the user authentication data and device identifier of the communication device against the previously registered information stored in user database 303. Credential request module 308 working in conjunction with the processor 301 may then request the credential from a server computer (e.g., a credential server) for use on the communication device. When credential request module 308 receives the credential from the server computer, credential request module 308 working in conjunction with the processor 301 may send the credential to the application executing on the communication device. In some embodiments, credential request module 308 working in conjunction with the processor 301 may also track which credential is provided to a particular communication device by storing this information in user database 303. Thus, user database 303 may include a mapping between a communication device and the credential provisioned to that communication device.

Cryptography engine 322 (which may work with a separate data processor in the HSM 320) may provide cryptographic functionalities for service provider computer 300. In some embodiments, cryptography engine 322 can be implemented in HSM 320, which is a specialized hardware component used to perform cryptographic operations and manage cryptographic keys. Cryptography engine 322 may be programmed to implement and perform encryption/decryption operations for service provider computer 300 using encryption algorithms such as such as AES, DES, TDES, or other suitable encryption algorithms using cryptographic keys of any length (e.g., 56-bit, 128-bit, 169-bit, 192-bit, 256-bit, etc.). In some embodiments, cryptography engine 322 can also be programmed to perform hash calculations using hash functions such as secure hash algorithm (SHA), or the like. For example, when service provider computer 300 receives a session key used for encrypting credentials from a server computer, service provider computer 300 may invoke cryptography engine 322 to encrypt the session key, such that session key can be provided to the application on the communication device in an encrypted form. In some embodiments, the session key can be encrypted using a hash value that is computed over the user authentication data associated with the user requesting the credential.

Figure 4:
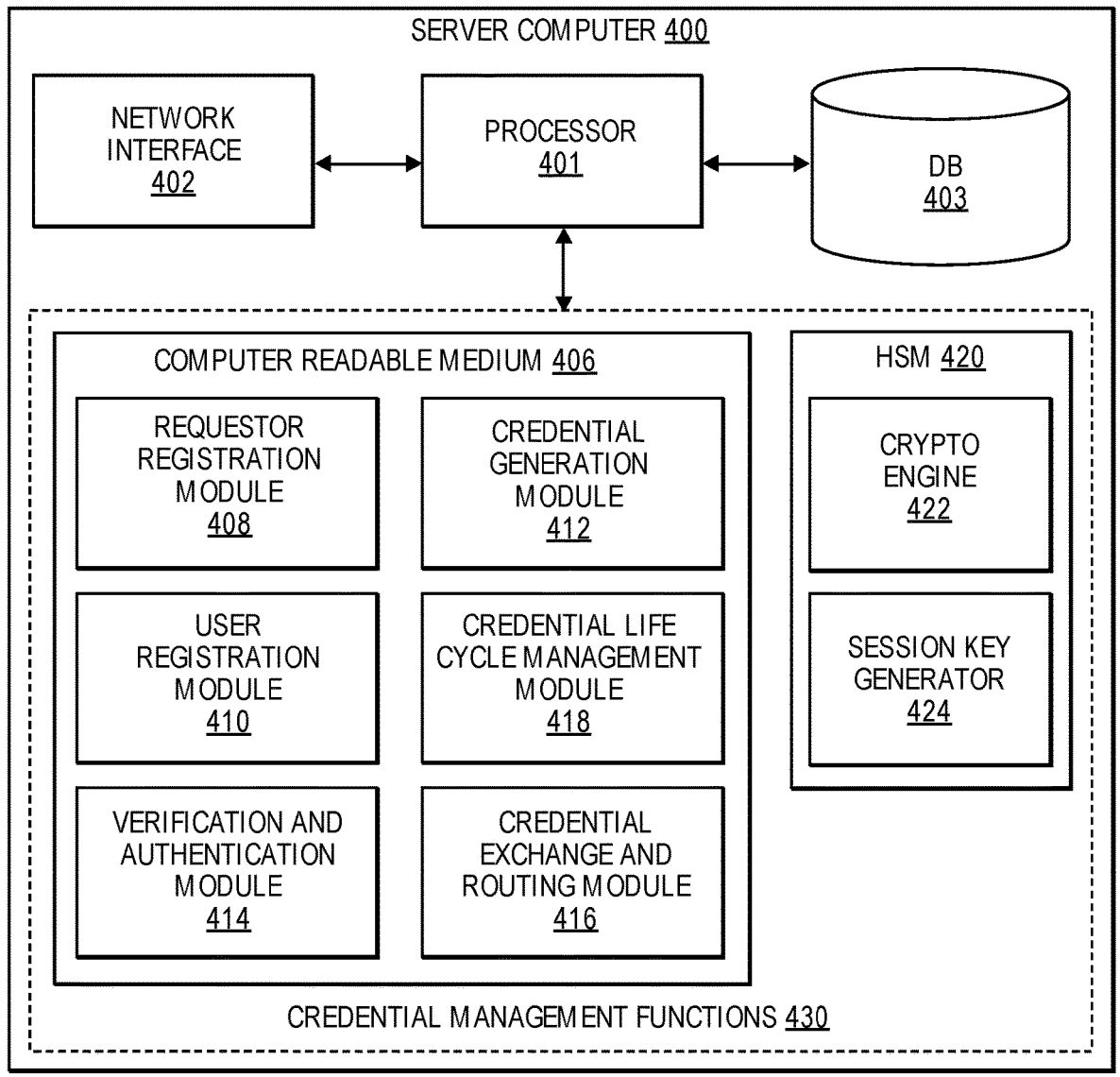
FIG. 4 shows a block diagram of a server computer according to embodiments of the present invention.

FIG. 4 shows a block diagram of a server computer 400 according to embodiments of the present invention. Server computer 400 may be used to implement server computer 130 of FIG. 1, for example, and may be a credential server computer (e.g., a token server computer). Server computer 400 may include a processor 401 coupled to a network interface 402 and a computer readable medium 406. In some embodiments, server computer 400 may also include a hardware security module (HSM) 420. Server computer 400 may also include a credential registry that may be internal or external to server computer 400.

Processor 401 may include one or more microprocessors to execute program components for performing the credential management functions 430 of server computer 400. Network interface 402 may be configured to connect to one or more communication networks to allow server computer 400 to communicate with other entities such as a communication device operated by a user, a service provider computer or a credential request computer, resource provider computer (e.g., merchant computer), transport computer (e.g., acquirer computer), transaction processing computer, authorizing entity computer (e.g., issuer computer), etc. Computer readable medium 406 may include any combination of one or more volatile and/or non-volatile memories, for example, RAM, DRAM, SRAM, ROM, flash, or any other suitable memory components. Computer readable medium 406 may store code executable by the processor 401 for implementing some or all of the credential management functions 430 of server computer 400 described herein. For example, computer readable medium 406 may include a requestor registration module 408, a user registration module 410, a credential generation module 412, a verification and authentication module 414, a credential exchange and routing module 416, and a credential life-cycle management module 418.

Requestor registration module 408 may, in conjunction with the processor 401, register a credential requestor entity (e.g., application provider) with the credential registry 404, and to generate a credential requestor identifier (ID) for the registered entity. Each registered entity can use their respective credential requestor ID as part of a token service request to facilitate identification and validation of the entity. In some embodiments, a credential requestor entity may provide token requestor information to the requestor registration module 408 such as an entity name, contact information, an entity type (e.g., merchant, wallet provider, payment service provider, issuer, payment enabler, acquirer, etc.). In some embodiments in which the credential is transaction related, the credential requestor information may also include credential presentment modes (e.g., scan, contactless, e-commerce, etc.), credential type (e.g., token, subtoken, payment identifier, static/dynamic, payment/non-payment), integration and connectivity parameters, and services subscribed (e.g., credential request, authentication and verification, life-cycle management, etc.) and any other relevant information for the onboarding process.

User registration module 410 may, in conjunction with the processor 401, perform registration of users and accounts of the users. In some embodiments, server computer 400 may allow authorized entities to register consumer accounts (e.g., payment or financial accounts) with the network credential system on behalf of the users. For example, a registered credential requestor may provide a credential requestor ID (e.g., received at the time of registration from the requestor registration module 408), an account identifier or other sensitive information or sensitive information identifier for which a credential can substitute, a consumer name and contact information, device identifier of the consumer's communication device, a credential type, and any other relevant information for individual account registration or bulk account registration. In some embodiments, user registration module 410 working in conjunction with the processor 401 may store the account details and sensitive information in credential registry 404 for all successful activation and registration requests. In some embodiment, an authorized entity may also unregister users and accounts by providing the necessary information to server computer 400.

Credential generation module 412 can be programmed to generate a credential or retrieve sensitive information in response to processing a request for a credential or sensitive information from a credential requestor (e.g., an application provider). In some embodiments, credential generation module 412 may be programmed to receive a credential requestor ID and an account identifier or sensitive information identifier. In some embodiments, credential generation module 412 may also be programmed to receive optional information such as a user name, a user address and zip code, a requested credential or sensitive information type (e.g., static, dynamic, non-payment, etc.), device identifier, and/or suitable information. In some embodiments, credential generation module 412 may be programmed to generate a response with the requested credential or requested sensitive information, a credential expiration date associated with the credential, and/or a credential assurance level associated with the credential. In some embodiments, credential generation module 412 may be programmed to validate the credential requestor ID and maintain the correlation between the credential, the sensitive information or account identifier being substituted by the credential, and the associated credential requestor. In some embodiments, credential generation module 412 may be programmed to determine if a credential already exists in the credential registry for a credential request before generating a new credential. In some embodiments, if a credential cannot be provisioned, the credential response may include a corresponding reason code. In some embodiments, credential generation module 412 may also be programmed to provide an interface to the credential requestors to submit a bulk credential request file.

In some embodiments, the credential may be generated on the fly using API calls. For example, when a request is received to tokenize an account identifier or other sensitive information, credential generation module 412 may determine a credential range to assign the credential. The credential range may be assigned based on whether the issuer is provisioning the credential (e.g., issuer assigned credential range) or the transaction processing network is provisioning the credential on behalf of the issuer (e.g., transaction processing network assigned credential range). As an example, if the transaction processing network assigned credential range includes "442400000-442400250," then "4424000000005382" may be assigned as a credential value. The database 403 may store the relationship of the credential range to the account identifier, and a credential add record may be logged. In some embodiments, credential generation module 412 may consider the credential range list associated with the account identifier range before assigning a credential.

Verification and authentication module 414 may, in conjunction with the processor 401, execute a consumer verification and authentication process, and determine a credential assurance level based on the outcome of the verification and authentication process. For example, the verification and authentication module 414, working in conjunction with the processor 401, can perform consumer authentication and verification through a configured authentication scheme. In some embodiments, the authentication scheme may include verification of the account identifier, verification values, the expiration date, and/or a delivery channel identifier based on the customer information stored in a database associated with the transaction processing network. In some embodiments, the authentication scheme may include direct verification of the consumer by the issuer using consumer credentials for their online banking system.

In some embodiments, user registration, credential generation, and verification and authentication may be performed as part of processing a single credential request process. In some embodiments, for bulk requests, user registration and credential generation may be performed by processing a bulk file from the credential requestor. In such embodiments, consumer verification and authentication may be performed in a separate step. In some embodiments, the credential requestor can request that the authentication and verification process be performed independently multiple times for a particular account to reflect any changes to the levels of assurance for the token over time.

Credential exchange and routing module 416 may, in conjunction with the processor 401, process requests for any underlying sensitive information (e.g., an account number) associated with a given credential. For example, a transaction processing network, acquirer, issuer, etc. may issue a request for a credential exchange during processing of a transaction. Credential exchange and routing module 416 may, in conjunction with the processor 401, validate that the requesting entity is entitled to make a request for a credential exchange. In some embodiments, credential exchange and routing module 416 may, in conjunction with the processor 401, validate the account identifier (or other sensitive information) to credential mapping and presentment mode based on the transaction timestamp and the credential expiration timestamp. Credential exchange and routing module 416 may, in conjunction with the processor 401, retrieve the account identifier (or other sensitive information) from credential registry 404, and provide it along with the assurance level to the requesting entity. In some embodiments, if the account identifier (or other sensitive information) to credential mapping is not valid for the transaction timestamp and presentment mode, an error message may be provided.

Credential life-cycle management module 418 may, in conjunction with the processor 401, perform life-cycle operations on the credentials managed by server computer 400. Life-cycle operations may include canceling a credential, activating or deactivating a credential, updating credential attributes, renewing credential with a new expiration date, etc. In some embodiments, a credential requestor entity may provide a credential requestor ID, a credential number, a life-cycle operation identifier and one or more credential attributes to server computer 400 to perform the requested life-cycle operation on a given credential. Credential life-cycle management module 418 may verify the credential requestor ID and the credential association based on information in database 403. Credential life-cycle management module 418 may, in conjunction with the processor 401, perform the requested life-cycle operation on a given credential, and update the corresponding associations in database 403. Examples of life-cycle operation may include a credential activation operation to activate an inactive, suspended, or temporarily locked credential and its associations; a credential de-activation operation to temporarily lock or suspend a credential; a cancel credential operation to permanently mark a credential and its associations as deleted to prevent any future transactions, etc. In some embodiments, a deleted credential may be used during returns/chargebacks if the same credential was used to submit the corresponding original transactions.

According to some embodiments, server computer 400 may include an HSM 420 to perform secure functions such as encryption and decryption operations and generation of cryptographic keys used for the encryption and decryption operations. For example, HSM 420 may include a cryptography engine 422 to execute encryption algorithms such as AES, DES, TDES, or other suitable encryption algorithms using cryptographic keys of any length (e.g., 56-bit, 128-bit, 169-bit, 192-bit, 256-bit, etc.). HSM 420 may also implement a session key generator 424 to generate a session key for each credential request that server computer 400 processes. The generated session key can be used to encrypt a credential generated or retrieved for the request, and the credential can be provided to the credential requestor in an encrypted form. For example, for each request that server computer 400 receives and processes, session key generator 424 may generate a session key that can be unique for each request received from the particular credential requestor, or unique to each request associate with a particular user or account. In some embodiments, the session key can be the same or different than the encryption key that is used to establish the secure communication channel (e.g., TLS, SSL, etc.) between the credential requestor and server computer 400. Credential generation module 412 may, in conjunction with the processor 401, generate or otherwise retrieve a credential to fulfill the request. The session key can be used by cryptography engine 422 and the processor 401 to encrypt that credential using an encryption algorithm, and the encrypted credential can be provided to the credential requestor. In some embodiments, the generated session key is also provided to the credential requestor with the encrypted credential.

Although server computer 400 and service provider computer 300 have been described with a HSM implementing only some of their functions, it should be understood that other functionalities of the respective computers (e.g., credential generation) can be implemented inside an HSM as well. Furthermore, some or all of the respective HSM functionalities can also be implemented outside of a HSM.

II. Methods

Figure 5:
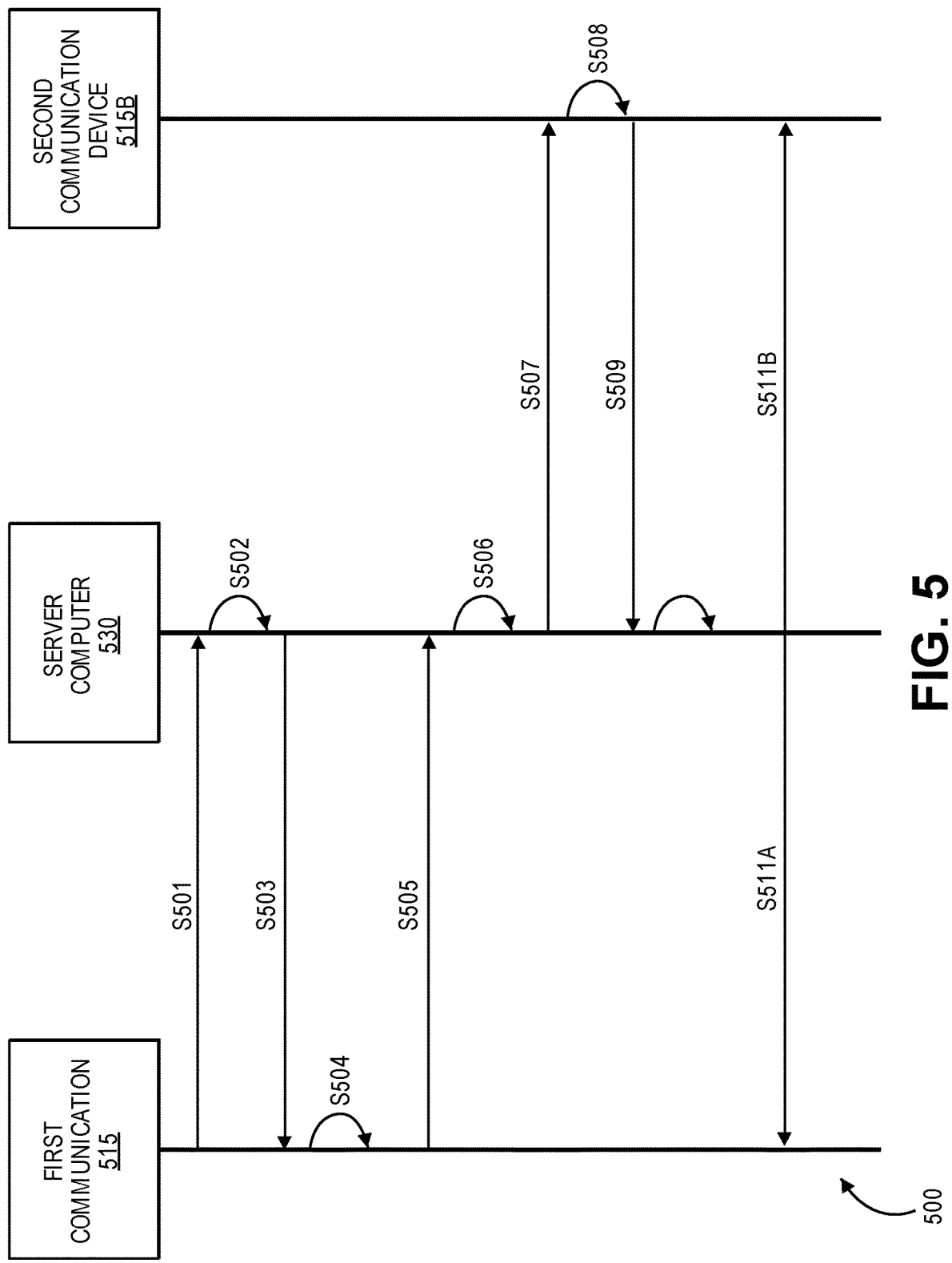
FIG. 5 shows a flowchart of a method for processing a request with a peer-forwarded credential according to embodiments of the present invention.

A method according to the embodiments of the invention can be described with respect to FIG. 5, which shows a flowchart 500 of a method for processing a request with a peer-forwarded credential according to embodiments of the present invention. FIG. 5 includes first communication device 515A, server computer 530, and second communication device 515B. In some embodiments, first communication device 515A may correspond to first communication device 101A of FIG. 1; server computer 530 may correspond to server computer 130 of FIG. 1; and/or second communication device 515B may correspond to second communication device 101B.

At step S501, the first communication device 515A conducts an enrollment process with a service provider computer. The service provider computer may communicate with server computer 530 over a communication network. The enrollment process may be conducted prior to a request (e.g., a transaction or access request) by a recipient. The enrollment process may enable a credential to be provisioned on first communication device 515A in accordance with a first data element (e.g., an amount, an access level, etc.).

At step S502, server computer 530 generates an original credential utilizing the enrollment information. At step S503, server computer 530 sends the generated original credential to first communication device 515A. The credential may be used for conducting purchases, for accessing buildings or data, etc.

Additionally, embodiments may enable first communication device 515A to request generation of a second credential associated with the original credential. The second credential may be utilized by a member of an authorized pool of users. In order to request generation of a second credential associated with the original credential, information surrounding the second credential may be entered using first communication device 515A.

Information surrounding the second credential may relate to an extent of use of the second credential, who can use the second credential, and/or how the second credential is delivered to its recipient. For example, if the second credential is a second payment token that is associated with a first payment token, then bounds such as a spending limit, an expiration date and/or time, specific merchant locations in which the second payment token can be used, etc. may be set by the by the user associated with the first payment token. The user may also specify the recipient of the second payment token and also the specific delivery channel that will be used to deliver the second payment token to the recipient. If the second credential is a second access token associated with a first access token, then bounds such as the places of use, the level of access at a particular place, as well as the duration of access may be specified. The user may also specify the recipient of the second access token and also the specific delivery channel that will be used to deliver the second access token to the recipient.

At step S504, a second data element (e.g., an amount, an access level, etc.) and a delivery channel identifier (e.g., e-mail address) associated with the recipient may be entered into first communication device 515A, as well as any other information surrounding the second credential. The information may be entered through a user interface on first communication device 515A. When entering the delivery channel identifier, the recipient may be verified as a member of the authorized pool of users. In some embodiments, a time period that the second credential can be active may also be entered. If the second credential is not utilized within the time period, the second credential may be invalidated.

At step S505, the entered information is confirmed, and a request is sent from first communication device 515A to generate the second credential. The request may include the original credential, data relating to the use of any credential(s) to be generated, as well as data relating the delivery channel to be used to send the second credential to the recipient.

At step S506, server computer 530 receives the request and generates the second credential. The second credential may be associated with the second data element (e.g., amount, access level, etc.) and delivery channel identifier (e.g., e-mail address) previously entered. In some embodiments, the second credential may be time-sensitive. For example, in an embodiment in which a time period that the second credential may stay active is designated by a user of first communication device 515A or assigned by server computer 530, the second credential may store an initial time-stamp and may not be able to be utilized by a recipient after the time period following the initial time-stamp has passed. Subsequently, a request utilizing the second credential cannot be fulfilled. In some cases, the second credential may be stored along with its corresponding delivery channel data, and the original credential from which the second credential was derived.

At step S507, server computer 530 sends the second credential to the recipient by the delivery channel (e.g., e-mail) associated with the delivery channel identifier (e.g., e-mail address) previously entered. The delivery channel may be any suitable channel that can securely deliver the second credential to the recipient without revealing the second credential to other entities. The delivery channel identifier may be a unique identifier linked to the recipient and associated with the delivery channel.

At step S508, the recipient operating second communication device 515B receives the second credential. The recipient may receive the second credential by the delivery channel and may access the second credential by accessing an account associated with the delivery channel identifier previously entered on first communication device 515A. For example, the recipient may access the second credential by opening their e-mail account associated with the recipient e-mail address entered on the first communication device 515A. In some embodiments, second communication device 515B may receive a notification to notify the recipient that they have received the second credential.

At step S509, the recipient associated with second communication device 515B provides the received second credential and the delivery channel identifier at the same time as a request (e.g., a transaction, access, purchase, etc.). The recipient may also provide their delivery channel identifier during the transaction as a signature verifying their authenticity. Recipient 102B may be able to utilize the second credential during a certain designated time period in some embodiments. If recipient 102B tries to utilize the second credential for a request after the time period has passed, an error may prevent the request from being fulfilled.

In the above example, the delivery channel identifier may be in clear text. In other embodiments, the delivery channel information may be encrypted, hashed, or otherwise obfuscated. In yet other embodiments, the delivery channel identifier or a derivative may be used to sign transaction or access data. The server computer 530 will have the means necessary to determine the delivery channel information in these situations.

At step S510, the request is fulfilled (e.g., transaction is processed or access is granted) using the second credential and according to the second data element. At steps S511A and S511B, after the request has been fulfilled, confirmation messages may be sent to first communication device 515A and second communication device 515B. The confirmation messages may be sent by the delivery channel utilized to send the second credential or by any other suitable communication channel.

Figure 6:
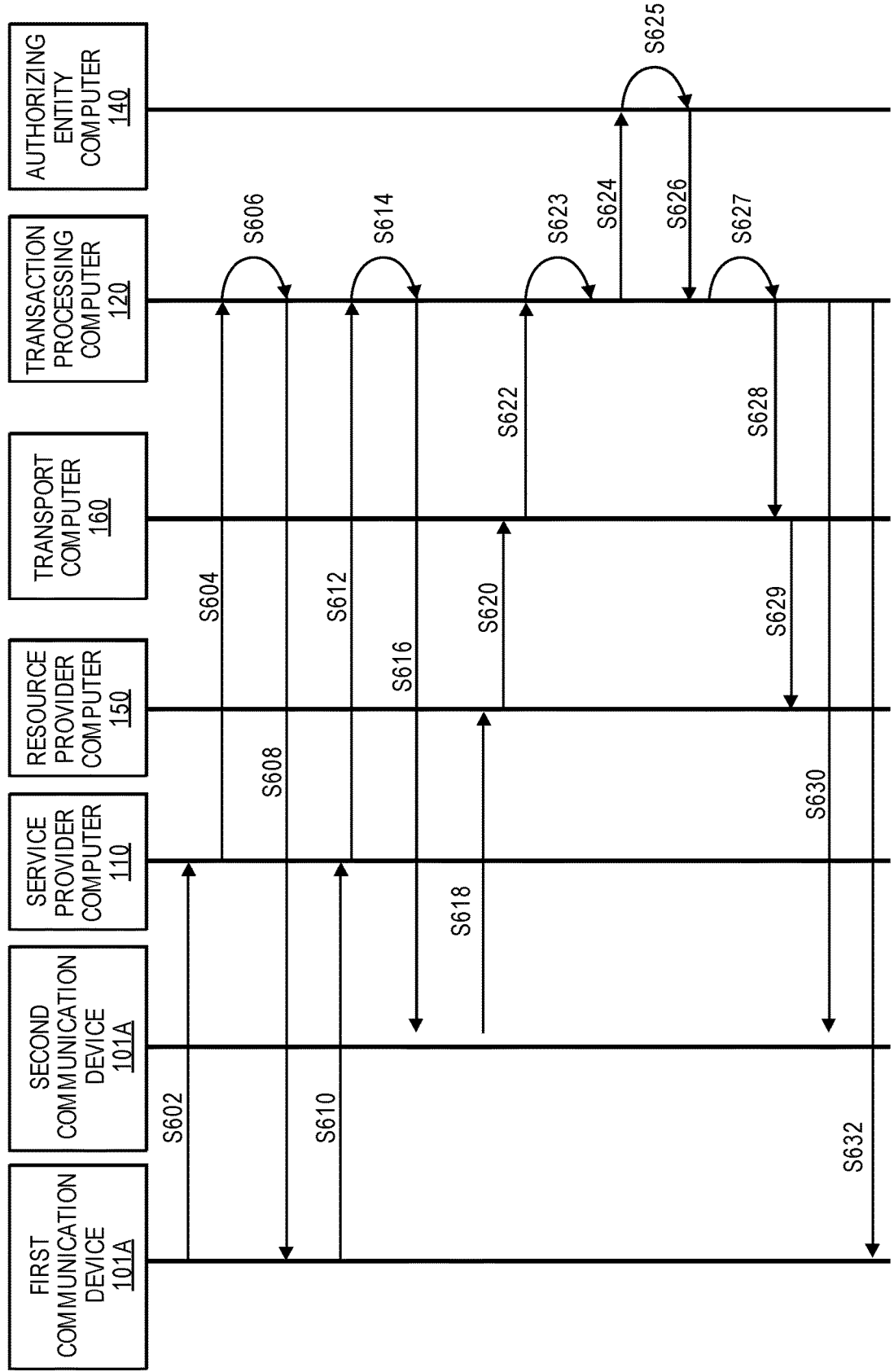
FIG. 6 shows a flowchart of a method for processing a transaction with a peer-forwarded subtoken according to embodiments of the present invention.

FIG. 6 shows a flowchart of a method for processing a transaction with a peer-forwarded subtoken according to embodiments of the present invention. FIG. 6 includes first communication device 101A operated by user 102A, second communication device 101B operated by recipient 102B, service provider computer 110, resource provider computer 150, transport computer 160, transaction processing computer 120, and authorizing entity computer 140. FIG. 6 may be described with reference to FIG. 1.

At step S602, user 102A conducts an enrollment process with a service provider computer 110 (e.g., a digital wallet application provider) on first communication device 101A to enroll an account and request a token associated with the account to utilize for transactions. The enrollment process may be conducted prior to a transaction by recipient 102B. User 102A may enter sensitive information (e.g., account information such as a PAN, expiration date, CVV, CVV2, etc.) in order to enable use of first communication device 101A for transactions. User 102A may further designate a payment pool (e.g., family members, friends, etc.) authorized to carry out transactions with subtokens generated from tokens associated with the account of user 102A. In some embodiments, members of the payment pool may be identified by a delivery channel identifier.

At step S604, the service provider computer 110 sends a request for a first token associated with the account of user 102A to transaction processing computer 120.

At step S606, the transaction processing computer 120 generates the token utilizing the enrollment information provided by user 102A. A credential generation module of transaction processing computer 120 may generate a payment token that can be used as a substitute for a real account identifier (e.g., a PAN), and maintain a stored association between the payment token and the PAN. A credential exchange module may be able to "translate" the payment token back to the original PAN for use during a transaction. The token may have an associated data element (e.g., an amount authorized to be used by user 102A).

At step S608, transaction processing computer 120 sends the generated token to first communication device 101A. The user 102A operating first communication device 101A may utilize the token to conduct purchases.

At step S610, user 102A requests generation of a subtoken associated with the token via first communication device 101A from service provider computer 110. The subtoken may be utilized by a member of the authorized payment pool (e.g., recipient 102B) managed by user 102A. In order to request generation of a subtoken associated with the token, user 102A may provide the token, and may enter information surrounding the subtoken using first communication device 101A. For example, user 102A may enter a data element (e.g., an amount) and a delivery channel identifier (e.g., e-mail address) associated with recipient 102B into first communication device 101A. The information may be entered through a user interface, which may be associated with a digital wallet application on first communication device 101A. When entering the delivery channel identifier, user 102A may verify that the recipient is an authorized member of the payment pool. The data element entered may be an amount or value that user 102A allows for the recipient 102B to utilize from the account of user 102A during a transaction. In some embodiments, user 102A may also enter a time period that the subtoken can be active. If the subtoken is not utilized within the time period, the subtoken may be invalidated. In one example, user 102A may confirm the entered information by activating a software button in the digital wallet application. In some embodiments, the button may be implemented with hardware or activated by other means (e.g., face, voice, biometric information, etc.).

In some embodiments, the generated subtoken may have the same form as the token from which it was generated. For example, the token may be 16 digits, and the subtoken may also be 16 digits. In other embodiments, the token may comprise a 16 digit number and a sequence number (e.g., 1). The subtoken may be the same 16 digit number with a different sequence number (e.g. 2).

At step S612, service provider computer 110 sends the request for the subtoken to transaction processing computer 120.

At step S614, transaction processing computer 120 receives the request and generated the subtoken. The subtoken may be associated with the data element (e.g., amount) and delivery channel identifier (e.g., e-mail address) entered by the user 102A. In some embodiments, the subtoken may be time sensitive. For example, if user 102A designates a time period that the subtoken may stay active, the subtoken may store an initial time stamp and may not be able to be utilized by recipient 102B after the time period following the initial time stamp has passed. Subsequently, a transaction utilizing the subtoken cannot be conducted, so no value is charged to the account of user 102A. In some embodiments, another entity, such as transaction processing computer 120, may determine the time period. In some cases, the subtoken may be stored along with its corresponding delivery channel data, and the token from which the subtoken was derived.

At step S616, transaction processing computer 120 sends the subtoken to second communication device 101B by the specified delivery channel (e.g., e-mail) associated with the delivery channel identifier (e.g., e-mail address) entered by the user 102A. The delivery channel may be any suitable channel that can securely deliver the subtoken to recipient 102B without revealing the subtoken to other entities. The delivery channel identifier may be a unique identifier linked to recipient 102B and associated with the delivery channel. Recipient 102B may access the subtoken by accessing an account associated with the delivery channel identifier entered by user 102A. For example, recipient 102B may access the subtoken by opening their e-mail account associated with the recipient e-mail address entered by user 102A. In some embodiments, second communication device 101B may receive a notification to notify recipient 102B that they have received the subtoken requested by user 102A.

At step S618, at a later time, the second communication device 101B provides the subtoken and the delivery channel identifier at the time of a transaction or purchase to resource provider computer 150. For example, recipient 102B may conduct a transaction at a POS terminal at resource provider computer 150. Second communication device 101B operated by recipient 102B may wirelessly communicate with an access device in communication with resource provider computer 150 by any suitable method (e.g., NFC, scannable image, etc.) to send the subtoken. Recipient 102B may also provide their delivery channel identifier during the transaction as a signature verifying their authenticity. The delivery channel identifier may be entered into the access device by recipient 102B. In some embodiments, recipient 102B may verbally communicate the delivery channel identifier or show the display screen of the second communication device 101B displaying the delivery channel identifier to the cashier at the POS terminal. In one embodiment, recipient 102B may be able to utilize the subtoken during a certain time period designated by user 102A. If recipient 102B tries to utilize the subtoken for a purchase after the time period has passed, an error may prevent the transaction from continuing.

The subtoken may be utilized by recipient 102B in other transaction environments as well. For example, recipient 102B may conduct an online transaction through an e-commerce web page and utilize the subtoken generated from the token during payment. A delivery channel identifier may be utilized as an authorization code to ensure that the subtoken was received and authorized for use by recipient 102B. In some embodiments, recipient 102B may pay with a digital wallet application on second communication device 101B, through which recipient 102B may provide the subtoken and delivery channel identifier.

At steps S620-S626, the transaction is processed using the subtoken.

At step S620, the resource provider computer 150 can generate an authorization request message comprising the subtoken and the amount of the transaction. Once generated, the authorization request message may be transmitted to the transport computer 160.

At step S622, the transport computer forwards the authorization request message to the transaction processing computer 120.

At step S623, after the transaction processing computer 120 receives the authorization request message, the transaction processing computer 120 can evaluate the subtoken to determine if it is being used under the conditions previously established by the user associated with the original payment token. For example, the user may have informed the transaction processing computer 120 that the transaction limit for the subtoken was for $100 and should only be used at grocery stores. If the data in the authorization request indicates that these conditions are not satisfied, then the transaction may be declined by the transaction processing computer 120. The transaction processing computer 120 may then generate and send an authorization response message back to the resource provider computer 150 informing the recipient of the subtoken that the transaction was denied. If the subtoken satisfies all conditions of use set forth by the user associated with the original payment token, then the transaction processing computer 120 can then determine the original payment token using the subtoken, and can determine the real PAN (primary account number) associated with the original payment token.

At step S624, the transaction processing computer may transmit the authorization request message with the real PAN to the authorizing entity computer 140.

At step S625, the authorizing entity computer then determines if the transaction can be authorized. The authorizing entity computer may determine if the account associated with the PAN in the authorization request message has sufficient funds or credit, and may also determine if the transaction exceeds a predetermined fraud threshold.

At step S626, after the authorizing entity computer 140 makes the authorization decision, it may generate and send an authorization response message approving or denying the transaction back to the transaction processing computer 120.

At step S627, the transaction processing computer 120 may determine the token from the PAN, and may also determine the subtoken from the token. The subtoken may then be inserted into the authorization response message to replace the PAN.

At steps S628 and S629, the transaction processing computer 120 may forward the authorization response message back to the resource provider computer 150 via the transport computer 160. The resource provider computer 150 will then store the subtoken in its records instead of the real PAN. No sensitive data associated with user 102A is exposed to recipient 102B and resource provider computer 150 in the above-noted process.

After the transaction has been completed, a confirmation message can be sent from transaction processing computer 120 to second communication device 101B at step S630, and to first communication device 101A at step S632. The confirmation messages may be sent by the delivery channel utilized to send the subtoken or by any other suitable communication channel.

At a later point in time, a clearing and settlement process can occur between the transport computer 160, the transaction processing computer 120, and the authorizing entity computer 140. The resource provider computer 150 may first provide a file with the subtoken and the associated transaction data to the transport computer 160. The transport computer 160 may then transmit any clearing and settlement messages to the transaction processing computer 120 using the subtoken. The subtoken may then be converted to the real PAN as described above in the authorization process to facilitate the exchange of messages and the transfer of funds between the transport computer 160 and the authorizing entity computer 140.

To provide a concrete example of the exemplary flow of FIG. 6, suppose a parent (e.g., user 102A) wants to distribute a subtoken to their child (e.g., recipient 102B) based upon a token in the parent's possession. The parent may want to provide their child with the subtoken to utilize at the movie theatre later in the day without the parent. The parent may add their child into their payment pool so that the child can be authorized to utilize the subtoken. Utilizing a mobile application on their communication device, the parent may enter an amount, such as $20, corresponding to the subtoken that the child can utilize. The parent may also enter the child's e-mail address through which the subtoken can be delivered to the child. Further, the parent may designate that the subtoken be valid until the end of the day.

The parent may confirm the information through a mobile application on their communication device and send it to a transaction processing computer, which may generate a subtoken and send the subtoken to the child's e-mail address for use. When the child is at the movie theatre, he may open the e-mail containing the subtoken from his mobile device and present it at a POS terminal. After providing his e-mail address through which the subtoken was sent as his signature, the subtoken can be authorized for use. The child can make a purchase of $20 value, which is charged to his parent's account. After the transaction is complete, e-mail confirmations may be sent to both the child and parent.

In some embodiments, user 102A may enter information corresponding to multiple recipients in order to distribute multiple credentials associated with the original credential. Each credential may comprise a different amount and recipient delivery channel identifier. For example, user 102A may send a first subtoken of value $20 to recipient A, a second subtoken of value $40 to recipient B, and a third subtoken of value $80 to recipient C, where all three recipients are members of the payment pool authorized by user 102A.

While the example above describes subtokens generated from an original token, embodiments are not so limited as the invention can be utilized in any peer to peer payment context. For example, it may be possible for user 102A to create a secondary account number from a real PAN associated with their account. The secondary account number may be sent to the e-mail address (or by another delivery channel) of recipient 102B. During a purchase, recipient 102B may provide their e-mail address (or other delivery channel identifier) and the secondary account number. In some embodiments, the secondary account number may be a prepaid account number. The prepaid account number may be utilized during a purchase by the recipient in a manner similar to cash. In some embodiments, the secondary account number may be associated with a second account, where a certain amount designated by user 102A may be deposited into the second account.

Also, in some embodiments, the sender's financial account information is masked from the recipient, so the recipient never receives or has access to the sender's financial account information.

Figure 7:
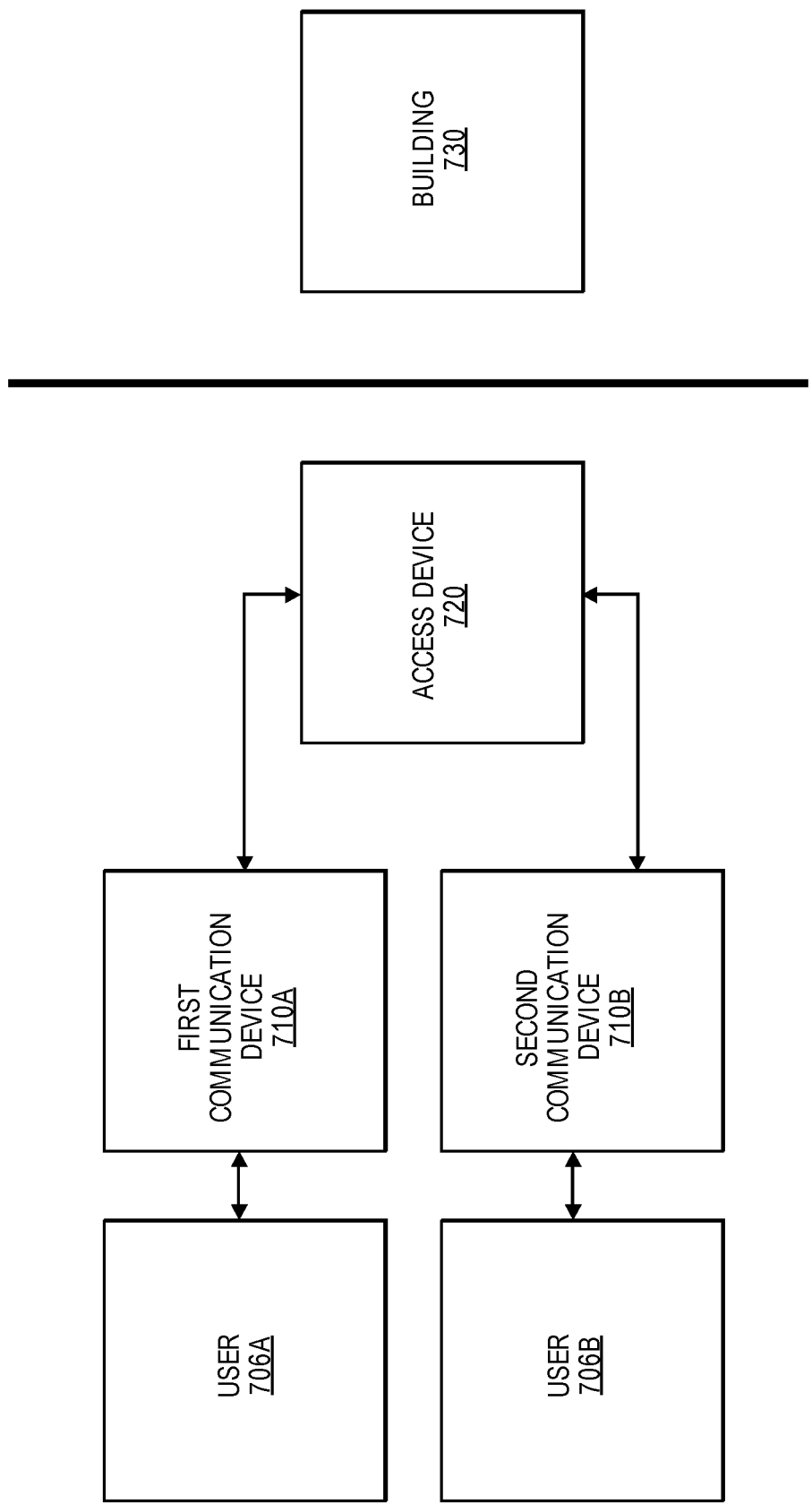
FIG. 7 shows a block diagram of a building access system according to embodiments of the present invention.

Generating subtokens associated with an original token that may be distributed to authorized entities can be applied outside of financial transaction contexts as well. For example, embodiments of the invention may be utilized to designate certain access privileges to an authorized pool of individuals who may provide a subtoken and the device channel identifier from which the subtoken was received in order to be granted access. For example, FIG. 7 shows a block diagram of a building access system according to embodiments of the invention. A user 706A operates a first communication device 710A having a first credential specifying a first data element (e.g., a first set of access rights). User 706A may request a second credential specifying a second data element (e.g., a second set of access rights) be provided to user 706B via second communication device 710B. The request may include a delivery channel identifier associated with user 706B. User 706B may receive the second credential via the delivery channel and provision it to the second communication device 710B. Thereafter, both first communication device 710A and second communication device 710B can interact with access device 720 and pass their respective credentials (and delivery channel identifier, in the case of second communication device 710B) to access device 720. The access device 720 may locally analyze the credentials to determine whether access should be granted to building 730, or it may communicate with a remotely located server computer (not shown). The remotely located server computer may analyze the security notification data to determine whether access should be granted to building 730, and may transmit a signal indicating this back to the access device 720. The access device 720 may then proceed to allow or deny access by the users 706A and/or 706B to the building 730, in accordance with the respective data elements.

Embodiments of the invention may provide a number of advantages. The invention enables users to authorize a specific amount or specific access level that can be utilized by an authorized recipient in the future. This is efficient since the requesting user does not have to be present or provide any input during a request by the recipient. Further, in the transaction context, the transaction may be connected to the account of the user only by the subtoken. This can ensure security of the transaction as no sensitive data associated with the user is exposed to the recipient and merchant. Embodiments of the invention are also convenient, since the original user can easily distribute and control the use of second credentials (e.g., subtokens) without opening new accounts for the recipients of those second credentials.

A computer system may be used to implement any of the entities or components described above. The subsystems of the computer system may be interconnected via a system bus. Additional subsystems such as a printer, keyboard, fixed disk (or other memory comprising computer readable media), monitor, which is coupled to display adapter, and others may be used. Peripherals and input/output (I/O) devices, which couple to an I/O controller (which can be a processor or other suitable controller), can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer readable medium. In some embodiments, the monitor may be a touch sensitive display screen.

A computer system can include a plurality of the same components or subsystems, e.g., connected together by an external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents. For example, although specific functions and methods have been described with respect to transaction processing computer 120 in FIG. 6, such functions could be performed by other computers such as the authorizing entity computer 140.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed:

1. A method comprising:

obtaining, by a server computer, a first credential comprising a payment account information of a first user, wherein the first credential is associated with an account maintained by an authorizing entity;

receiving, by the server computer from a user device associated with the first user, an indication of a data element, an indication of a second user that is different from the first user, and a delivery channel identifier of the second user, wherein the delivery channel identifier associated with a delivery channel of a plurality of potential delivery channels belonging to the second user, wherein the second user is a user in a payment pool comprising a plurality of users who are authorized to receive peer-forwarded credentials from the first user;

verifying that the second user is in the payment pool of users who are authorized to receive the peer-forwarded credentials from the first user;

after verifying that the second user is in the payment pool of users who are authorized, generating, by the server computer, a second credential that is a peer-forwarded credential comprising payment account information for the second user in the payment pool of users who are authorized and corresponding to the data element based on bounds identified for the second user, wherein the second credential is generated from the first credential of the first user and wherein the second credential is generated for the second user;

sending, by the server computer, the second credential to the second user through the delivery channel of the plurality of potential delivery channels corresponding to the delivery channel identifier;

receiving, by the server computer from an access device, the second credential comprising the payment account information of the second user and the delivery channel identifier within an authorization request message for a transaction conducted by the second user, wherein the second credential is received by the access device from a mobile device via a wireless communication and the delivery channel identifier is received by the access device via manual entry;

authenticating the second user upon determining that the delivery channel identifier included in the authorization request message matches the delivery channel identifier associated with the first user;

upon determining, by the server computer, that the transaction complies with one or more conditions of the data element;

retrieving, by the server computer, the first credential associated with the account maintained by the authorizing entity;

replacing, by the server computer, the second credential associated with the second user with the first credential associated with the first user within the authorization request message; and transmitting, by the server computer, the authorization request message including the first credential to the authorizing entity.

2. The method of claim 1, wherein the first credential comprises a token and the second credential comprises a subtoken that is associated with the token.

3. The method of claim 1, wherein the second credential is different from the first credential.

4. The method of claim 1, wherein the delivery channel identifier is an e-mail address.

5. The method of claim 1, further comprising:
sending, by the server computer, confirmation messages of fulfillment of an authorization request to at least one of the first user and the second user.

6. The method of claim 1, wherein the server computer generates the second credential in response to a request by the first user.

7. The method of claim 6, wherein the request by the first user specifies the second credential for the second user.

8. The method of claim 1, wherein the delivery channel is a text message.

9. A server computer comprising:
a processor; and
a memory element comprising code, executable by the processor, for implementing a method comprising:
obtaining, by the server computer, a first credential comprising payment account information of a first user;
receiving, from a user device associated with the first user, an indication of a data element, an indication of a second user that is different from the first user, and a delivery channel identifier of the second user, wherein the delivery channel identifier associated with a delivery channel of a plurality of potential delivery channels belonging to the second user, wherein the second user is a user in a payment pool comprising a plurality of users who are authorized to receive peer-forwarded credentials from the first user;
verifying that the second user is in the payment pool of users who are authorized to receive the peer-forwarded credentials from the first user;
after verifying that the second user is in the payment pool of users who are authorized, generating, by the server computer, a second credential that is a peer-forwarded credential comprising payment account information for the second user in the payment pool of users who are authorized and corresponding to the data element based on bounds identified for the second user, wherein the second credential is generated from the first credential of the first user and wherein the second credential is generated for use by the second user;
sending, by the server computer, the second credential to the second user through the delivery channel of the plurality of potential delivery channels corresponding to the delivery channel identifier;
receiving, by the server computer from an access device, the second credential comprising the payment account information of the second user and the delivery channel identifier within an authorization request message for a transaction conducted by the second user, wherein the second credential is received by the access device from a mobile device and the delivery channel identifier is received by the access device via manual entry;
authenticating the second user upon determining that the delivery channel identifier included in the authorization request message matches the delivery channel identifier associated with the first user;
upon determining, by the server computer, that the transaction complies with one or more conditions of the data element;
retrieving the first credential associated with the first user;
replacing the second credential associated with the second user with the first credential associated with the first user within the authorization request message; and
transmitting the authorization request message including the first credential to an authorizing entity.

10. The server computer of claim 9, wherein the first credential comprises a token and the second credential comprises a subtoken that is associated with the token.

11. The server computer of claim 9, wherein the second credential is different from the first credential.

12. The server computer of claim 9, wherein the delivery channel identifier is an e-mail address.

13. The server computer of claim 9, wherein the method further comprises:
sending, by the server computer, confirmation messages of fulfillment of an authorization request to at least one of the first user and the second user.

14. The server computer of claim 9, wherein the server computer generates the second credential in response to a request by the first user.

15. The server computer of claim 14, wherein the request by the first user specifies the second credential for the second user.

16. The server computer of claim 14, wherein the method further comprises:
receiving constraints on the use of the second credential.

17. The server computer of claim 9, wherein the delivery channel is a text message.

18. A method comprising:
receiving, by a communication device, a second credential, that is a peer-forwarded credential comprising payment account information for a second user, through a delivery channel, wherein the second credential is generated from a first credential comprising payment account information of a first user that is different from the second user, wherein the second user is a user that is verified to be in a payment pool comprising a plurality of users who are authorized to receive peer-forwarded credentials from the first user;
providing, by the communication device to an access device of a resource provider in a transaction, the second credential, wherein the access device separately receives a delivery channel identifier from the second user of the communication device, and wherein the second credential and the delivery channel identifier are transmitted by the access device in an authorization request message to a transaction processing computer, wherein the transaction processing computer is caused to replace the second credential of the authorization request message with the first credential and forward the authorization request message to an authorization entity associated with the first credential, and wherein the delivery channel identifier is used to authenticate the user of the communication device upon determining that the delivery channel identifier included in the authorization request message matches the delivery channel identifier associated with user of the communication device; and receiving, by the communication device from the transaction processing computer, a confirmation message relating to the transaction.

19. The method of claim 18, wherein the first credential is a token and the second credential is a subtoken.

20. The method of claim 18, wherein the delivery channel is a text message.

* * * * *